(12) United States Patent
Fink et al.

(10) Patent No.: US 8,566,353 B2
(45) Date of Patent: Oct. 22, 2013

(54) WEB-BASED SYSTEM FOR COLLABORATIVE GENERATION OF INTERACTIVE VIDEOS

(75) Inventors: Michael Fink, Jerusalem (IL); Ryan Junee, San Francisco, CA (US); Sigalit Bar, Cupertino, CA (US); Aviad Barzilai, Haifa (IL); Isaac Elias, Haifa (IL); Julian Frumar, San Francisco, CA (US); Herbert Ho, San Jose, CA (US); Nir Kerem, Har Adar (IL); Simon Ratner, San Francisco, CA (US); Jasson Arthur Schrock, Mountain View, CA (US); Ran Tavory, Haifa (IL); Virginia Wang, San Francisco, CA (US); Leora Wiseman, Zichron Yaakov (IL); Shanmugavelayutham Muthukrishnan, Palo Alto, CA (US); Mihai Badoiu, New York, NY (US); Ankur Bhargava, Cambridge, MA (US); Igor Kofman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 369 days.

(21) Appl. No.: 12/388,365

(22) Filed: Feb. 18, 2009

(65) Prior Publication Data
US 2009/0300475 A1   Dec. 3, 2009

Related U.S. Application Data

(60) Provisional application No. 61/058,459, filed on Jun. 3, 2008.

(51) Int. Cl.
*G06F 17/30* (2006.01)
(52) U.S. Cl.
USPC .......................................... 707/782; 707/789
(58) Field of Classification Search
USPC .......... 707/742, 784, 748, 782, 781; 715/202, 715/230
See application file for complete search history.

(56) References Cited

U.S. PATENT DOCUMENTS 5,708,845 A * 1/1998 Wistendahl et al. .......... 715/202
5,812,642 A    9/1998 Leroy
(Continued)

FOREIGN PATENT DOCUMENTS

JP    2006155384 A    6/2006
KR   2007-0004153 A1  1/2007

OTHER PUBLICATIONS

"Video Marketing, Video Editing & Hosting, Interactive Video," Veeple.com, 2009, 1 page, [online] [Retrieved on Apr. 20, 2009] Retrieved from the internet <URL:http://www.veeple.com/interactivity.php>.

(Continued)

*Primary Examiner* — Sherief Badawi
(74) *Attorney, Agent, or Firm* — Fenwick & West LLP

(57) ABSTRACT

Systems and methods are provided for adding and displaying interactive annotations for existing online hosted videos. A graphical annotation interface allows the creation of annotations and association of the annotations with a video. Annotations may be of different types and have different functionality, such as altering the appearance and/or behavior of an existing video, e.g. by supplementing it with text, allowing linking to other videos or web pages, or pausing playback of the video. Authentication of a user desiring to perform annotation of a video may be performed in various manners, such as by checking a uniform resource locator (URL) against an existing list, checking a user identifier against an access list, and the like. As a result of authentication, a user is accorded the appropriate annotation abilities, such as full annotation, no annotation, or annotation restricted to a particular temporal or spatial portion of the video.

20 Claims, 5 Drawing Sheets

(56) References Cited

U.S. PATENT DOCUMENTS

| | | | |
|---|---|---|---|
| 5,966,121 A * | 10/1999 | Hubbell et al. | 715/726 |
| 6,006,241 A | 12/1999 | Purnaveja et al. | |
| 6,289,346 B1 | 9/2001 | Milewski et al. | |
| 6,295,092 B1 | 9/2001 | Hullinger et al. | |
| 6,415,438 B1 * | 7/2002 | Blackketter et al. | 725/136 |
| 6,570,587 B1 * | 5/2003 | Efrat et al. | 715/723 |
| 6,774,908 B2 * | 8/2004 | Bates et al. | 345/589 |
| 6,792,618 B1 | 9/2004 | Bendinelli et al. | |
| 6,993,347 B2 | 1/2006 | Bodin et al. | |
| 7,032,178 B1 | 4/2006 | McKnight et al. | |
| 7,055,168 B1 | 5/2006 | Errico et al. | |
| 7,137,062 B2 | 11/2006 | Kaufman et al. | |
| 7,149,755 B2 | 12/2006 | Obrador | |
| 7,254,605 B1 | 8/2007 | Strum | |
| 7,559,017 B2 * | 7/2009 | Datar et al. | 715/230 |
| 7,599,950 B2 | 10/2009 | Walther et al. | |
| 7,761,436 B2 | 7/2010 | Norton et al. | |
| 8,202,167 B2 * | 6/2012 | Ackley et al. | 463/43 |
| 8,209,223 B2 * | 6/2012 | Fink et al. | 705/14.4 |
| 8,280,827 B2 * | 10/2012 | Muller et al. | 706/11 |
| 8,392,834 B2 * | 3/2013 | Obrador | 715/723 |
| 2001/0023436 A1 | 9/2001 | Srinivasan et al. | |
| 2002/0059218 A1 | 5/2002 | August et al. | |
| 2002/0059584 A1 | 5/2002 | Ferman et al. | |
| 2002/0065678 A1 | 5/2002 | Peliotis et al. | |
| 2002/0069218 A1 * | 6/2002 | Sull et al. | 707/501.1 |
| 2002/0078092 A1 * | 6/2002 | Kim | 707/513 |
| 2002/0120925 A1 | 8/2002 | Logan | |
| 2002/0188630 A1 * | 12/2002 | Davis | 707/512 |
| 2003/0039469 A1 * | 2/2003 | Kim | 386/69 |
| 2003/0068046 A1 | 4/2003 | Lindqvist et al. | |
| 2003/0093790 A1 | 5/2003 | Logan et al. | |
| 2003/0107592 A1 | 6/2003 | Li et al. | |
| 2003/0112276 A1 | 6/2003 | Lau et al. | |
| 2003/0196164 A1 | 10/2003 | Gupta et al. | |
| 2003/0231198 A1 | 12/2003 | Janevski | |
| 2004/0021685 A1 | 2/2004 | Denoue et al. | |
| 2004/0125133 A1 | 7/2004 | Pea et al. | |
| 2004/0138946 A1 | 7/2004 | Stolze | |
| 2004/0168118 A1 | 8/2004 | Wong et al. | |
| 2004/0205482 A1 | 10/2004 | Basu et al. | |
| 2005/0044254 A1 | 2/2005 | Smith | |
| 2005/0081159 A1 | 4/2005 | Gupta et al. | |
| 2005/0160113 A1 | 7/2005 | Sipusic et al. | |
| 2005/0203876 A1 | 9/2005 | Cragun et al. | |
| 2005/0203892 A1 | 9/2005 | Wesley et al. | |
| 2005/0289469 A1 * | 12/2005 | Chandler et al. | 715/745 |
| 2006/0053365 A1 | 3/2006 | Hollander et al. | |
| 2006/0064733 A1 * | 3/2006 | Norton et al. | 725/135 |
| 2006/0087987 A1 | 4/2006 | Witt et al. | |
| 2006/0200832 A1 * | 9/2006 | Dutton | 719/318 |
| 2006/0286536 A1 * | 12/2006 | Mohler et al. | 434/350 |
| 2006/0294085 A1 | 12/2006 | Rose et al. | |
| 2006/0294134 A1 * | 12/2006 | Berkhim et al. | 707/102 |
| 2007/0002946 A1 | 1/2007 | Bouton et al. | |
| 2007/0099684 A1 * | 5/2007 | Butterworth | 463/1 |
| 2007/0162568 A1 | 7/2007 | Gupta et al. | |
| 2007/0250901 A1 | 10/2007 | McIntire et al. | |
| 2008/0005064 A1 | 1/2008 | Sarukkai | |
| 2008/0028294 A1 | 1/2008 | Sell et al. | |
| 2008/0046458 A1 * | 2/2008 | Tseng et al. | 707/102 |
| 2008/0086742 A1 | 4/2008 | Aldrey et al. | |
| 2008/0091723 A1 | 4/2008 | Zuckerberg et al. | |
| 2008/0168073 A1 * | 7/2008 | Siegel et al. | 707/100 |
| 2008/0250331 A1 | 10/2008 | Tulshibagwale | |
| 2008/0284910 A1 * | 11/2008 | Erskine et al. | 348/468 |
| 2009/0165128 A1 * | 6/2009 | McNally et al. | 726/21 |
| 2009/0199251 A1 | 8/2009 | Badoiu et al. | |
| 2009/0204882 A1 | 8/2009 | Hollander et al. | |
| 2009/0210779 A1 | 8/2009 | Badoiu et al. | |
| 2009/0249185 A1 | 10/2009 | Datar et al. | |
| 2009/0297118 A1 | 12/2009 | Fink et al. | |
| 2009/0300475 A1 | 12/2009 | Fink et al. | |
| 2010/0169927 A1 | 7/2010 | Yamaoka et al. | |

OTHER PUBLICATIONS

"More on Mojiti," bavatuesdays.com, Mar. 23, 2007, 4 pages, [online] [Retrieved on Apr. 20, 2009] Retrieved from the internet <URL:http://bavatuesdays.com/more-on-mojiti/>.

"BubblePLY," PLYmedia Inc. 2008, 1 page, [online] [Retrieved on Apr. 20, 2009] Retrieved from the internet URL:http://www.plymedia.com/products/bubbleply/bubbleply.aspx>.

"Ooyala—Interactive Video Advertising," Ooyala, Inc. 2009, 1 page, [online] [Retrieved on Apr. 20, 2009] Retrieved from the internet <URL:http://www.ooyala.com/products/ivideo>.

MirriAd, 2008, 1 page, [online] [Retrieved on Apr. 20, 2009] Retrieved from the internet <URL:http://www.mirriad.com>.

Gonzalez, N., "Video Ads: Every Startup Has a Different Solution," TechCrunch, Jul. 6, 2007, 7 Pages, [online] [Retrieved on Apr. 20, 2009] Retrieved from the internet <URL:http://www.techcrunch.com/2007/07/06/video-ads-somebody-needs-to-solve-this-problem/>.

Screenshot of "Remixer", YouTube.com, May 2007 to Feb. 2008, 1 page.

Screenshot of Veeple Labs—Interactive Video, [online] [Retrieved on Jun. 9, 2008] Retrieved from the internet <URL:http://www.veeple.com/>.

Screenshot of "Interactive Video Demo—Check out the Yelp / AdSense demo," Ooyala, Inc. 2009, [online] [Retrieved on Apr. 23, 2009] Can be retrieved from the internet <URL:http://www.ooyala.com/products/ivideo>.

PCT International Search Report and Written Opinion, PCT Application No. PCT/US2009/042919, Jun. 17, 2009.

Mikolajczyk, K. et al., "A Performance Evaluation of Local Descriptors", IEEE Transactions on Pattern Analysis and Machine Intelligence, Oct. 2005, vol. 27, No. 10, pp. 1615-1630, 16 pages.

Arman, F., et al., "Image Processing on Encoded Video Sequences", ACM Multimedia Systems Journal, pp. 211-219, vol. 1, No. 5, 1994.

Ford, R., et al., *Metrics for shot boundary detection in digital video sequences*, Multimedia Systems, Jan. 2000, pp. 37-46, vol. 8.

Good, R., "Online Video Publishing Gets Into the Conversation: Click.TV," Robin Good, What Communication Experts Need to Know, Apr. 18, 2006, 10 pages, [online] [retrieved on Jan. 16, 2007] Retrieved from the Internet: <URL: http://www.masternewmedia.org/news/2006/04/18/online_video_publishing gets_into.html>.

Moenne-Loccoz, N., et al., "Managing Video Collections at Large," CUDB '04: Proceedings of the 1st International Workshop on Computer Vision Meets Database, Jun. 2004, pp. 59-66.

Naphade, M.R., et al., "A High Performance Shot Boundary Detection Algorithm using Multiple Cues", 1998 International Conference on Image Processing, pp. 884-887, Oct. 4-7, 1988, Chicago, IL, USA.

Tjondronegoro, D., et al., "Content-Based Video Indexing for Sports Applications Using Integrated Multi-Modal Approach," Multimedia '05: Proceedings of the 13th Annual ACM International Conference on Multimedia, Nov. 2005, p. 1035-1036.

Zabih, R., et al., "A Feature-Based Algorithm for Detecting and Classifying Scene Breaks", Proc. ACM Multimedia 95, pp. 189-200, Nov. 1993, San Francisco, CA.

Zentation.com [online] [Retrieved on Jun. 26, 2009] Retrieved from the internet <URL:http://www.zentation.com/>.

Zentation.com [online] [Retrieved on Jun. 26, 2009] Retrieved from the internet <URL:http://www.zentation.com/viewer/index.phppasscode=epbcSNExIQr>.

Zentation.com [online] [Retrieved on Jun. 26, 2009] Retrieved from the internet <URL:http://www.zentation.com/viewer/setup.php?passcode=De2cwpjHsd>.

"New Feature: Link within a Video," Google Video Blog, Jul. 19, 2006, [online] [Retrieved on Jul. 18, 2008] Retrieved from the internet <URL:http://googlevideo.blogspot.com/2006/07/new-feature-link-within-video_19.html>.

"New commenting and stats features," Google Video Blog, Nov. 14, 2006, [online] [Retrieved on Jul. 18, 2008] Retrieved from the internet <URL:http://googlevideo.blogspot.com/2006/11/new-commenting-and-stats-features.html>.

(56) References Cited

OTHER PUBLICATIONS

"Online Media Bookmark Manager," Media X, Date Unknown, [online] [Retrieved on Jul. 18, 2008] Retrieved from the internet <URL:http://mediax.standford.edu/documents/bookmark.pdf>.
"Ticket #3504 (new enhancement)," Participatory Culture Foundation, Software Development, Aug. 14, 2006, 1 page, [online] [retrieved on Jan. 16, 2007] Retrieved from the Internet: <URL: https://develop.participatoryculture.org/trac/democracy/ticket/3504>.
Korean Intellectual Property Office Notice of Preliminary Rejection, Korean Patent Application No. 10-2009-7015068, Feb. 5, 2010, 12 pages.
Korean Intellectual Property Office Notice of Preliminary Rejection, Korean Patent Application No. 10-2009-7015068, Oct. 5, 2009, 4 pages.
PCT International Search Report and Written Opinion, PCT/US2009/034422, Oct. 6, 2009, 12 Pages.
PCT International Search Report and Written Opinion, PCT/US2007/088067, Jul. 21, 2008, 13 pages.
PCT International Search Report and Written Opinion, PCT/US2009/042919, Jun. 17, 2009, 8 pages.
PCT International Search Report and Written Opinion, PCT/US2009/033475, Aug. 20, 2009, 7 Pages.
Office Action mailed May 2, 2011, for U.S. Appl. No. 12/389,359, 12 pages.
Examiner's first report on Australian Patent Application No. AU 2010249316, Mailed Jun. 20, 2011, 3 Pages.
Extended European Search Report for European Patent Application No. EP 09711777, Dec. 12, 2012, 16 pages.
Miyamori, H., et al: "Generation of views of TV content using TV viewers' perspectives expressed in live chats on the web", Proceedings of the 13th Annual ACM International Conference on Multimedia, Multimedia '05, Nov. 6, 2005, p. 853-861.
Office Action for Canadian Patent Application No. CA-2,726,777, Nov. 26, 2012, 3 pages.
Caspi, Y. et al., "Sharing Video Annotations," 2004 International Conference on Image Processing (ICIP), Singapore, Oct. 24-27, 2004, pp. 2227-2230.
Chinese First Office Action, Chinese Application No. 200910206036.4, Sep. 18, 2012, 19 pages.
Chinese First Office Action, Chinese Application No. 200980108230.7, Feb. 28, 2012, 11 pages.
Chinese Second Office Action, Chinese Application No. 200980108230.7, Aug. 13, 2012, 11 pages.
Chinese Office Action, Chinese Application No. 200780050525.4, Jan. 18, 2012, 23 pages.
European Extended Search Report, European Application No. 07865849.9, May 18, 2012, 7 pages.
Gordon, A.S., "Using Annotated Video as an Information Retrieval Interface," Proceedings of the 5$^{th}$ International Conference on Intelligent User Interfaces (IUI), New Orleans, Jan. 2000, pp. 133-140.
United States Office Action, U.S. Appl. No. 12/389,359, Dec. 8, 2011, 15 pages.
Office Action for Canadian Patent Application No. CA-2,672,757, Mar. 21, 2013, 5 pages.

\* cited by examiner

WEB-BASED SYSTEM FOR COLLABORATIVE GENERATION OF INTERACTIVE VIDEOS

CROSS REFERENCE TO RELATED APPLICATIONS

This application claims the benefit of Provisional Application No. 61/058,459, filed on Jun. 3, 2008, which is hereby incorporated herein by reference.

TECHNICAL FIELD

The disclosed embodiments relate generally to the collaborative generation of interactive features for digital videos.

BACKGROUND

Conventional web-based systems permitting the storage and display of digital videos typically only allow commenting on the video as a whole. In particular, if viewers wish to comment on or otherwise reference a particular portion of the video, they are obliged to explicitly describe the portion by text or time in the video and other indirect means. Conventional systems also have simplistic controls for annotating a video, to the extent that they allow such annotation at all. Rather, such systems either allow only the owner (e.g., a user who uploaded the video) to add annotations, or else allow all users to do so, without restrictions.

SUMMARY

The present invention includes systems and methods for adding and displaying interactive annotations for online hosted videos. A graphical annotation interface allows the creation of annotations and association of the annotations with a video. Annotations may be of different types and have different functionality, such as altering the appearance and/or behavior of an existing video, e.g. by supplementing it with text, allowing linking to other videos or web pages, or pausing playback of the video.

Authentication of a user desiring to perform annotation of a video may be performed in various manners, such as by checking a uniform resource locator (URL) against an existing list, checking a user identifier against an access list, and the like. As a result of authentication, a user is accorded the appropriate annotation abilities, such as full annotation, no annotation, or annotation restricted to a particular temporal or spatial portion of the video.

The features and advantages described in this summary and the following detailed description are not all-inclusive. Many additional features and advantages will be apparent to one of ordinary skill in the art in view of the drawings, specification, and claims presented herein.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF DRAWINGS

Figure 1:
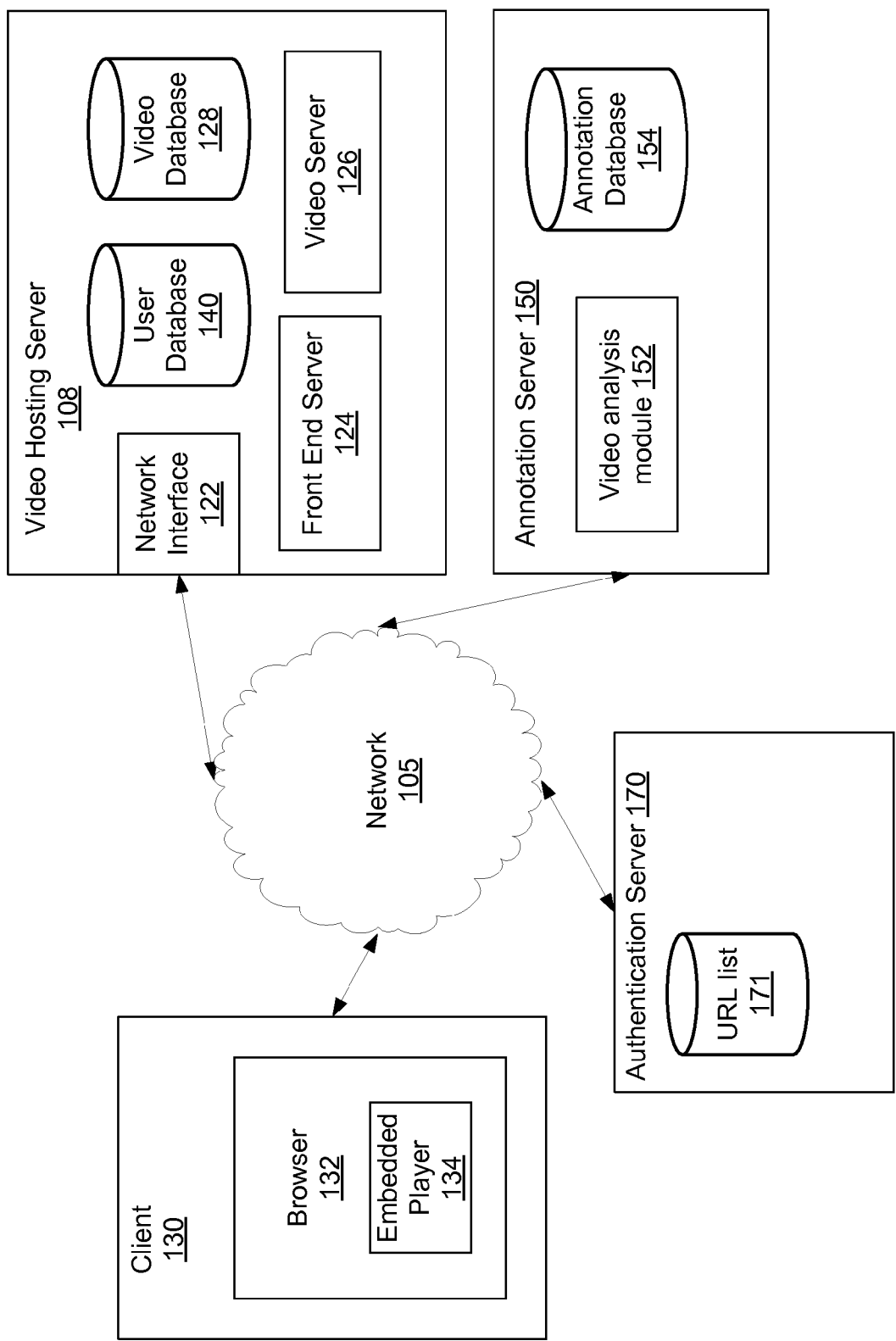
FIG. 1 is a block diagram of a system architecture for allowing annotation of online hosted videos, according to one embodiment.

FIG. 1 is a block diagram of a system architecture in accordance with one embodiment. As illustrated in FIG. 1, a video hosting server 108 includes a front end server 124, a video server 126, a network interface 122, a video database 128, and a user database 140. Other conventional features, such as firewalls, load balancers, application servers, failover servers, site management tools, and so forth are not shown so as to more clearly illustrate the features of the system. Examples of a suitable video hosting server 108 for implementation of the system include the YouTube™ and Google Video™ websites; other video hosting sites are known as well, and can be adapted to operate according the teaching disclosed herein. It will be understood that the term "website" represents any system and method of providing content and is not intended to be limited to systems that support content provided via the Internet or the HTTP protocol. The various servers are conventionally implemented, whether as a single piece of software or hardware or as multiple pieces of software or hardware and can couple to the network 105 via the network interface 122. In general, functions described in one embodiment as being performed on the server side can also be performed on the client side in other embodiments if appropriate.

A client 130 executes a browser 132, and connects to the front end server 124 via a network 105, which is typically the Internet, but may also be any network, including but not limited to a LAN, a MAN, a WAN, a mobile, wired or wireless network, a private network, or a virtual private network. While only a single client 130 and browser 132 are shown, it is understood that very large numbers (e.g., millions) of clients are supported and can be in communication with the video hosting server 108 at any time. The client 130 may include a variety of different computing devices. Examples of client devices 130 are personal computers, digital assistants, personal digital assistants, cellular phones, mobile phones, smart phones or laptop computers. As will be obvious to one of ordinary skill in the art, the present invention is not limited to the devices listed above.

In some embodiments, the browser 132 includes an embedded video player 134 such as, for example, the Flash™ player from Adobe Systems, Inc. or any other player adapted for the video file formats used in the video hosting video hosting server 108. A user can access a video from the video hosting server 108 by browsing a catalog of videos, conducting searches on keywords, reviewing play lists from other users or the system administrator (e.g., collections of videos forming channels), or viewing videos associated with a particular user group (e.g., communities).

Video server 126 receives uploaded media content from content providers and allows content to be viewed by client 130. Content may be uploaded to video server 126 via the Internet from a personal computer, through a cellular network from a telephone or PDA, or by other means for transferring data over network 105 known to those of ordinary skill in the art. Content may be downloaded from video server 126 in a similar manner; in one embodiment media content is provided as a file download to a client 130; in an alternative embodiment, media content is streamed client 130. The means by which media content is received by video server 126 need not match the means by which it is delivered to client 130. For example, a content provider may upload a video via a browser on a personal computer, whereas client 130 may view that video as a stream sent to a PDA. Note also that video server 126 may itself serve as the content provider. Communications between the client 130 and video hosting server 108, or between the other distinct units of FIG. 1, may be encrypted or otherwise encoded.

Users of clients 130 can also search for videos based on keywords, tags or other metadata. These requests are received as queries by the front end server 124 and provided to the video server 126, which is responsible for searching the video database 128 for videos that satisfy the user queries. The video server 126 supports searching on any fielded data for a video, including its title, description, tags, author, category and so forth.

Users of the clients 130 and browser 132 can upload content to the video hosting server 108 via network 105. The uploaded content can include, for example, video, audio or a combination of video and audio. The uploaded content is processed and stored in the video database 128. This processing can include format conversion (transcoding), compression, metadata tagging, and other data processing. An uploaded content file is associated with the uploading user, and so the user's account record is updated in the user database 140 as needed.

For purposes of convenience and the description of one embodiment, the uploaded content will be referred to a "videos", "video files", or "video items", but no limitation on the types of content that can be uploaded are intended by this terminology. Each uploaded video is assigned a video identifier when it is processed.

The user database 140 is responsible for maintaining a record of all users viewing videos on the website. Each individual user is assigned a user ID (also referred to as a user identity). The user ID can be based on any identifying information, such as the user's IP address, user name, or the like. The user database may also contain information about the reputation of the user in both the video context, as well as through other applications, such as the use of email or text messaging. The user database may further contain information about membership in user groups, e.g. a group of users that can view the same annotations. The user database may further contain, for a given user, a list of identities of other users who are considered friends of the user. (The term "list", as used herein for concepts such as lists of authorized users, URL lists, and the like, refers broadly to a set of elements, where the elements may or may not be ordered.)

The video database 128 is used to store the received videos. The video database 128 stores video content and associated metadata, provided by their respective content owners. The video files have metadata associated with each file such as a video ID, artist, video title, label, genre, and time length.

An annotation server 150 provides the ability to view and add annotations to videos in the video database 128. The annotation server 150 collects various annotations-such as text boxes, "thought bubbles", and the like-from uploads by a user or the owner of a video, from publishers, or as a result of video analysis techniques. It then stores these annotations within an annotation database 154. The annotation server 150 also provides to entities such as the client 130 or the video hosting server 108, for a given video, annotations stored within the annotation database 154 for that video. Generally, an annotation modifies the behavior of an otherwise non-interactive video, providing interactive overlays with which a user can interact, or altering the usual flow of playback of the video, for example. Examples of interactive overlays include text boxes, thought bubbles, spotlights, hyperlinks, menus, polls, and the like, any of which can have an arbitrarily sophisticated user interface behavior. In one embodiment, the annotation server 150 is on a separate physical server from the video hosting server 108, although in other embodiments the annotation functionality is included within the video hosting server 108.

The annotation database 154 maintains an association between each annotation and the appropriate portion of the annotated video. In one embodiment, for example, the annotation database 154 stores an identifier of the annotation type (e.g., a text box) along with any information associated with that type (e.g., a text caption), a time stamp(s) of the video to which the annotation applies (e.g., from time 01:05 to time 01:26), an identifier of the video which the annotation annotates, and an identifier of a user who submitted the annotation (e.g., a username). Some types of annotation may also be associated with a link to another web page, video, network object, or the like. Many other storage implementations for annotations would be equally possible to one of skill in the art.

A video analysis module 152 can be used by the annotation server 150 to automatically generate annotations, or to suggest them to a user. This can entail techniques such as speech analysis, vision analysis (e.g., face detection, object recognition, and optical character recognition (OCR)), or crawling annotations explicitly or implicitly available.

Since annotation of videos may be accomplished from remote locations over the network 105 by a variety of users, an authentication mechanism can be used to restrict annotations to only a subset of users. Thus, an authentication server 170 is provided to verify access by clients 130 to annotation functionality of the annotation server 150. As described further below, authentication may be performed in a number of ways in different embodiments, such as using secret links, access control lists, user credibility scores, or permissions based on community moderation. In one embodiment, a three-tiered permissions system is employed, with a first, lowest permission tier for users who can only view and interact with annotations of a video by clicking on links, a second, higher permission tier for those users who can add or modify their own annotations, and a third, highest permission tier for those users who can also modify and delete any annotations in the video. The use of secret links employs a URL list 171, which associates videos with a URL through which access to an annotation interface is obtained. In one embodiment, the authentication server 170 is implemented as a component of video hosting server 108.

Figure 2:
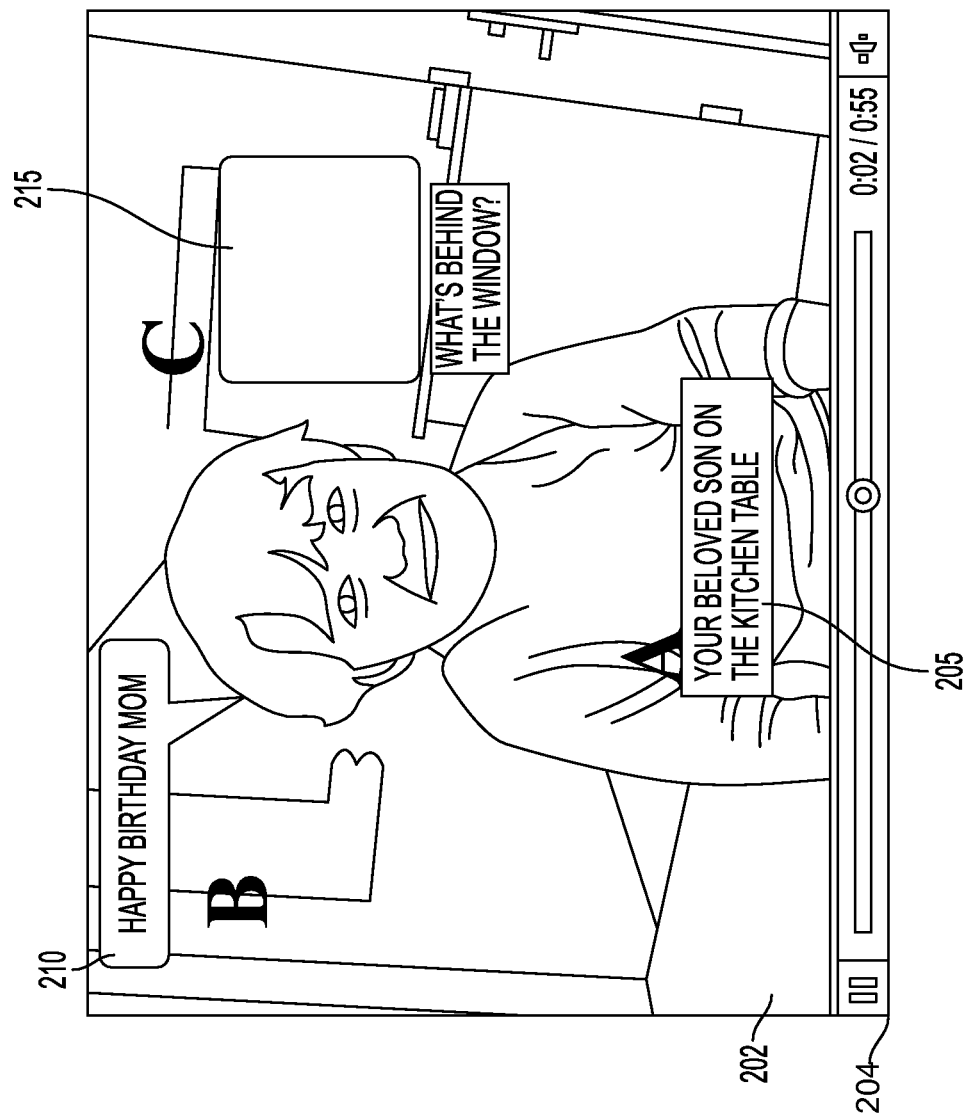
FIG. 2 illustrates different types of annotations that may be added to a video, according to one embodiment.

FIG. 2 illustrates some different types of interactive annotations (hereinafter "annotations") that may be added to a video, according to one embodiment. A main video area 202 displayed on the client 130 plays a video stored in the video database 128 and served to the client 130 by the video server 126. Playback can be controlled via, for example, a video controls area 204. In the illustrated example, three distinct annotations 205-215 have been added. Annotations 205 and 210 are text boxes and thought bubbles, which display static text. Annotation 215 is a spotlight that displays text, e.g. "What's behind the window?" in response to a user hovering the mouse within its boundaries. Any of these annotation types can have a time range during which it is active, e.g. from a time 0:15 to 0:36. For example, the text box 205 could be set to appear 15 seconds into the playing of the video and disappear 21 seconds later, after a user has had a chance to read it.

Any of these annotation types may also have arbitrarily sophisticated presentation, such as shape and text coloring and styling, or associated actions, such as displaying additional annotations or redirecting the user to a target web-based location such as a uniform resource locator (URL) upon being activated, such as by a mouse click, mouse over, press of a key corresponding to the annotation, or the like. The target location to which control is transferred could include an advertisement, or content including an advertisement. For example, clicking on spotlight 215 could lead to a web page describing a particular product. The target location could also cause display of an object or scene taken from a different perspective, e.g. the back side of an object taken from a different camera angle. Additionally, the target location could have a link, button, or annotation that transfers control back to the original video, instead of to a different video. In one embodiment, control can be transferred back to a particular moment in the original video, e.g., as specified by a URL encoding the video identifier and a description of the moment in the video, such as "t=0:22", denoting a time 22 seconds into the video. Such uses of time stamps in URLs can be used to construct, for example, a branching series of pages, which can be used to create an interactive storyline within a single video. This allows, for example, rapid transfer to another video portion, without the delay entailed by obtaining a different video. In one embodiment, an annotation can be displayed conditionally, for example if a user mouses over another annotation, when that other annotation is displayed either at the same time or a later time.

Annotations may also be added to modify the playback of the video, rather than to present an interactive graphical interface. For example, a pause annotation causes playback of the video to halt for a given time delay, including an unlimited time. This allows, for example, an arbitrary amount of time for users to make a choice before the video continues. Using the time stamps in URLs as described above, one can modify the playback of a video so that, for example, clicking (or even positioning the mouse over) a door will seek to the portion of the video that displays the door opening and the room behind it. This can increase the level of interactivity in a video to a degree similar to that of a computer game.

The use of various types of annotations can be used to modify standard linear video viewing in a number of different ways. They could be used to implement, for example, a menu-style interface, in which the video displays several choices via annotations with links to other pages, and then pauses the video to allow the user to select one of the choices. The menu items could be still annotations, animated video annotations, and the like, and could be displayed in a traditional list of items, as separate labeled visual objects, or in a variety of other manners. They could also be used to implement branching storylines, where clicking on one annotation leads to one continuation of the video, and clicking on a different annotation leads to a different continuation. For example, annotations could be used to implement an interactive game of "rock, paper, scissors", in which, for instance, clicking on an annotation corresponding to a "rock", "paper", or "scissors" choice leads to a separate video or portion of the same video depicting a tie, a win, or a loss, respectively, each outcome potentially leading to the display of additional annotations representing a second round of the game. The menu items could also be used to implement multi-perspective storylines, wherein clicking on the annotated face of an actor leads to seeing the remainder of the story from that actor's perspective.

Figure 3:
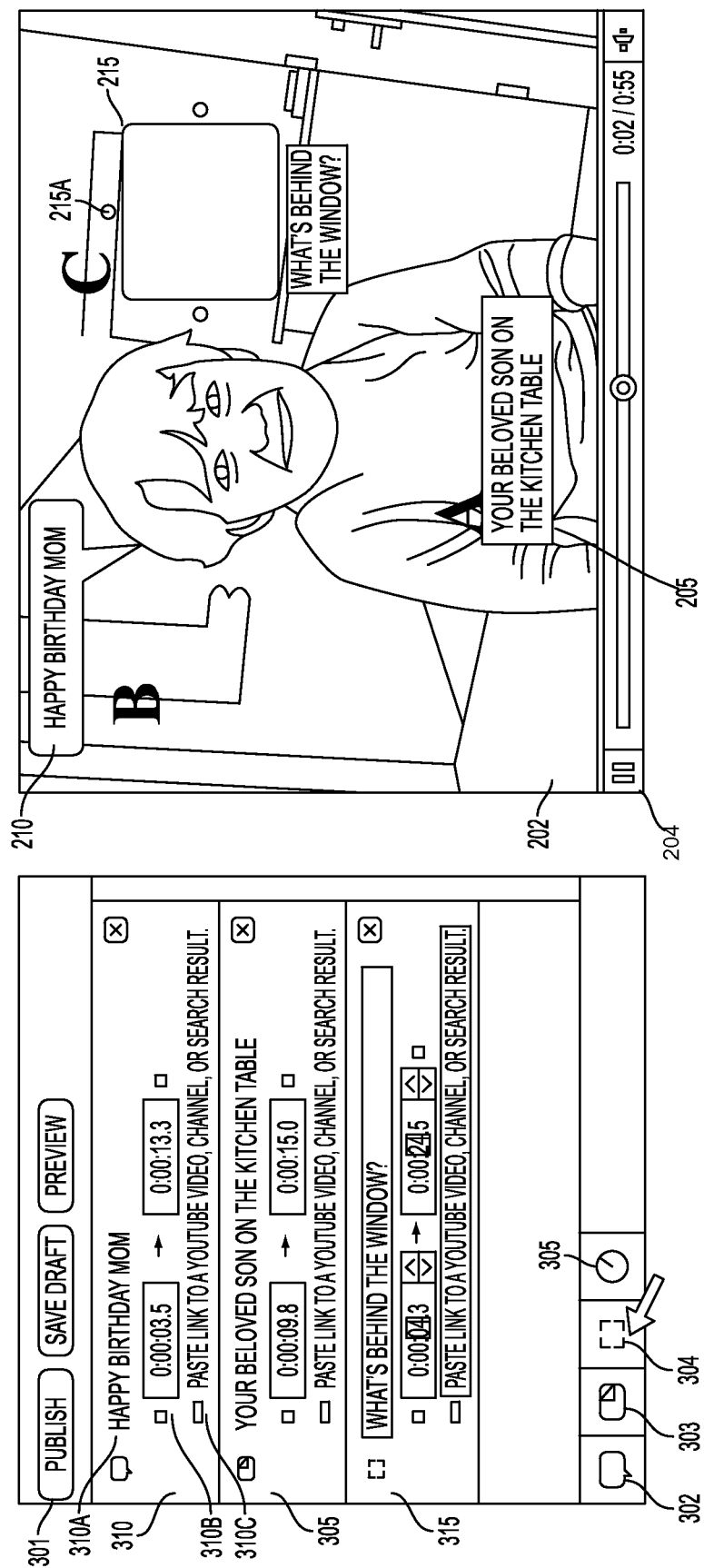
FIG. 3 depicts a user interface for creating the annotations of FIG. 2, according to one embodiment.

FIG. 3 depicts a user interface for manually creating the annotations of FIG. 2, according to one embodiment. Annotation icons 302-305 correspond to four annotation types (speech bubbles, text boxes, spotlights, and pauses, respectively); selecting one of them and then clicking on the playing video creates an annotation of that type at the location and time corresponding to the click. The annotation then has default values, such as text captions, time ranges, boundaries, and associated URLs. In FIG. 3, editing regions 310, 305, and 315 correspond to displayed annotations 205, 210, and 215, respectively, and the contents thereof can be edited to change the values of the caption. Editing region 310, for example, comprises a text caption 310A, a time range 310B, and a link 310C. The link can be, for example, a page within the video service that denotes a watch page for a video or that denotes a channel displaying thumbnails for several related videos. The text caption 310A has been set to the value "Happy birthday mom" by the user, and the time range 310B is set to last from 0:00:03, fifth frame, to 0:00:13, third frame, and the link 310C does not yet have a specified value. Editing of annotations can also be accomplished graphically; for example, the boundary of callout 215 can be changed by dragging on the handles 215A associated with the boundaries.

As an alternative or addition to manually creating the annotations using the user interface of FIG. 3, the video analysis module 152 of FIG. 1 can be used to automatically detect temporal and spatial locations to add annotations, to determine their associated values, and/or to control the behavior of existing annotations.

One example for such analysis is face detection, which can be used in the video of FIG. 3 to detect the face of the boy in the images as a human face and to suggest the creation of a text bubble in association therewith, or it could be used to automatically provide or suggest a caption describing the recognized face.

Another example could include applying object recognition methods based on local descriptor matching. (See, for example, "A Performance Evaluation of Local Descriptors", Mikolajczyk, K.; Schmid, C., IEEE Transactions on Pattern Analysis and Machine Intelligence, Volume 27, Issue 10:1615-1630). Such object recognition can identify instances of known textured objects, such as locations, buildings, books, CD covers, and the like. (Example images for training recognition of such objects can be readily found in product/location catalogs which associate the product name with one or more images of the product). Once an object, such as the cover of a particular CD, is detected, the manual annotation process can be simplified by providing an educated guess regarding the object's spatial and temporal positioning.

Recognized objects can then be associated with annotations, such as links presenting more information, e.g. from a given viewpoint. For example, events can be presented from a national perspective by using object recognition to identify objects associated with a certain nationality and presenting associated information, e.g. associating, with the Indian team members of a cricket match, a link to the next event that the team will be participating in. As another example, an athlete recognized using object recognition can be associated with a link or other annotation data that provides statistics, personal information, etc. on the athlete.

Additionally, in conjunction with a search index of a search engine such as Google™ or YouTube™, if an object in a video is indeed recognized, then a phrase describing that product could be executed against the search index and the top search result suggested as a link for the object (e.g., searching for the title of a recognized music CD and linking to a product search page corresponding to that title).

In one embodiment, an annotation link corresponds to a search query so that if a user clicks on the annotation, the user will see a search result page for the query. For example, a user may view all videos posted by a person in the video who has been identified by the user and whose name has been used as a search term. This type of annotation allows the results page to be up to date since a search on a search term associated with an annotation will not always yield the same results page.

Object recognition could further be used to identify locations of interest, and in combination with "geotagged" videos in which location information is embedded, videos related to the recognized location could be provided or suggested as links.

Object recognition could further be augmented by tracking the movement of the object across frames, thereby moving any associated annotations along with it. For example, if the boy moved his position in the various frames of the video, object recognition could be used to track the boy's face as he moves and to automatically reposition the text bubble 210 near the detected face in each frame. This would be a type of annotation that moves within the frame in connection with an object in the frame. In the case of a Flash player, analysis of the video would preferably be done on the server while display of the annotation in different frame locations during video play would generally be achieved within the player as the object moves within the video.

Yet another type of analysis is optical character recognition (OCR), the details of which are known to one of skill in the art. For example, words on a billboard could be recognized using OCR and a corresponding textual caption automatically provided or suggested for the billboard.

Figure 4:
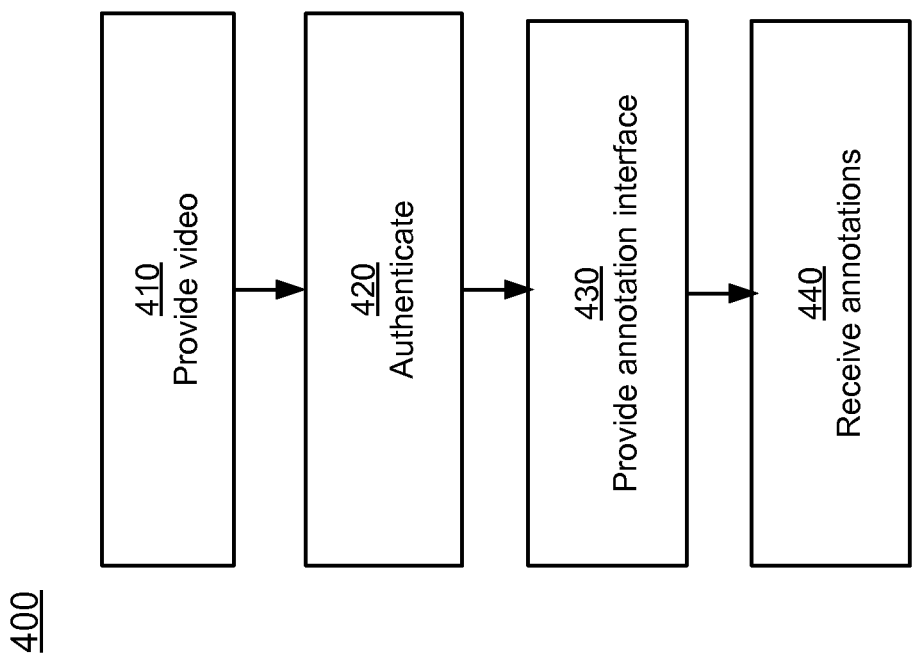
FIG. 4 illustrates the steps involved in adding annotations to videos, according to one embodiment.

FIG. 4 illustrates steps involved in adding annotations to videos, according to one embodiment. The client 130 requests a video from the video server 108 using the network 105. The front end server 124 of the video hosting server 108 receives the request and delegates to the video server 126, which obtains the video from the video database 128 and provides it 410 to the client 130. In one embodiment, the video hosting server 108 then delegates to the annotation server 150 to provide the annotation user interface; in other embodiments, the video hosting server 108 requests the annotations for the video from the annotation server 150 and then itself provides the annotation user interface, providing any annotations created via the user interface to the annotation server for storage. In one embodiment, the provided annotation user interface differs depending on the identity of the user doing the annotation. For example, if the annotating user is not the owner of the video (e.g., the one who submitted the video to the video hosting server 108), then the user could be provided an editing interface such as that already described in FIG. 3. In some embodiments, only owners of a video or people specified by the owner may annotate a video. In some embodiments, only owners of a video or categories of people specified by the owner (e.g., people on the owners friends list) may annotate a video. In some embodiments, anyone may annotate a video. If the annotating user is the owner of the video, or some other user with similar privileges, then a more full-featured annotation interface such as that in FIG. 5 can be provided.

Figure 5:
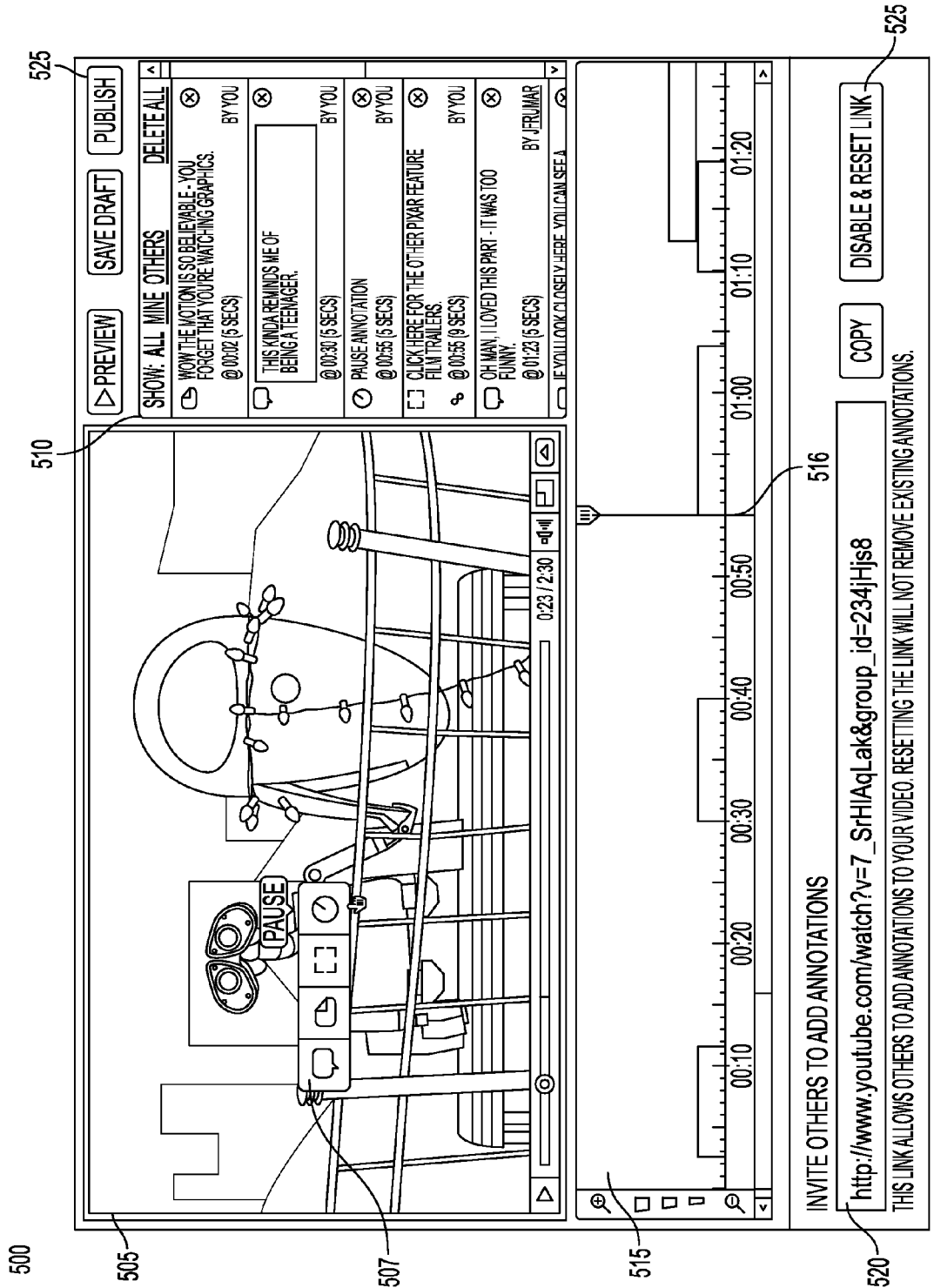
FIG. 5 illustrates an annotation interface allowing the addition of annotations and providing information on existing annotations, according to one embodiment.

FIG. 5 illustrates an annotation interface 500 that both allows the addition of annotations and also provides information on all existing annotations associated with the video. In some embodiments, only an owner may use such an interface. In other embodiments, a wider group of users may use such an interface. A video area 505 displays the video, and annotation editing controls 507 allow the addition of annotations to the video in a manner similar to that of controls 302-305 in FIG. 3. An annotation list 510 displays a list of all the annotations currently associated with a video, including the type, the associated textual caption, the time of the video to which the annotation applies, the user who submitted the annotation, and the like. A visual timeline 515 graphically displays the time locations of the various annotations associated with the video. For example, a marker 516 indicates the location of a newly-added Pause annotation, and dragging the marker 516 changes the duration and/or time location of the pause.

Referring again to FIG. 4, the determination of which type of annotation user interface to provide (e.g., that of the owner, of that of another user)-which can be used to control the degree to which annotation may be added-may involve the use of the authentication server 170, which authenticates 420 the user. The authentication server decides in different ways in different embodiments what access to annotations a given user has. In one embodiment, the authentication server 170 only allows creation of annotations by the owner of the video. In this embodiment, the authentication server 170 consults the user database 140 to determine the identity (e.g., the username) of the owner of the video and compares it to the identity of the currently active user. If the currently active user has no identity (e.g., is not signed in), or the identity does not match that of the owner of the video, then the ability to annotate is not provided.

In another embodiment, the owner of the video grants access to users by providing them with a special URL associated with that video. For example, referring again to FIG. 5, the owner interface 500 includes a URL area 520 that lists a URL associated with the video in the URL list 171. The owner may then copy this URL and distribute it as desired to other users who the owner wishes to have annotation abilities, e.g. by emailing the URL to friends, posting it on a web page available to friends, and the like. Then, when a user enters the URL, the authentication server 170 compares the URL to those in the URL list 171 for the given video; if the URL matches, then an annotation user interface is provided. In case the URL becomes too widely-distributed and an excessive number of unwanted annotations are being added to the video, the owner may use button 525 to disable the addition of further annotations, in which case the URL becomes invalid for purposes of further annotation.

In yet another embodiment, the owner may grant annotation permissions to particular users of the video hosting server 108, e.g. by specifying a list of authorized usernames. The permissions can be to annotate, in which case any user on the list would be provided with an annotation interface when viewing that video. In another embodiment, the permissions are to suggest annotations, in which case the user interface would allow tentative annotations to be added but not actually displayed during playback until approved by the owner or other authorized user. The permissions could also be restricted to allowing annotation of particular temporal portions or physical areas of the video. This can be implemented by allowing the owner to define a "collaborative region" in his or her video using the same spatial and temporal controls provided by the annotations editor, such as by specifying a time range using controls such as the time range control 310B of FIG. 3 and an area by graphically selecting the region in the video area 202. Data defining the collaborative region can then be stored, e.g., within the annotation database 154. With the collaborative region defined, other users determined to be collaborators of the video owner (e.g., those considered "friends" of the user) are permitted to add annotations to the video, but only within the spatial and temporal extent of the specified collaborative region.

In yet another embodiment, the access control lists need not be strictly predefined by the owner or other authorized users, but can be dynamically determined based on external factors. For example, the lists could be based on credibility scores of the user (the credibility scores being calculated by, e.g., monitoring how many previous annotations by this contributor were deleted by content owners, or by community moderation actions such as users expressing approval or disapproval of the user's video ratings, such as via "thumbs-up" or "thumb-down" indicators) or of those considered friends of the user in the user database 140 (e.g., based on activities such as active email exchanging, or on explicit indications of friendship, such as adding someone to a "friends" list).

In still another embodiment, annotations are defined in a layered approach in which the creator of the annotation determines visibility of the annotation at video playback time. In this approach, different users or groups of users may freely define their own annotations, but the resulting annotations will only be visible to those users or groups when the video is played.

After the authorization server 170 has determined which annotation interface the user is authorized to see-such as the interfaces of FIGS. 3 or 5, or a basic playback interface not allowing the creation of annotations-the annotation server 150 then provides 430 that annotation interface to the user, optionally along with any pre-existing annotations for that video. If the interface allows the creation of annotations, then the user uses the interface to specify the properties of the annotations. The results are then transmitted to the video database 128, e.g. in response to the user selecting the publish button 525 of FIG. 5 after having specified the desired annotations, which then receives 440 and stores the annotations.

A similar process occurs when viewing an annotated video. First, the client 130 requests a video from the video server 108 using the network 105. The front end server 124 of the video hosting server 108 receives the request and delegates to the video server 126, which obtains the video from the video database 128. The video hosting server 108 then obtains the appropriate annotations from the annotation database 154 of the annotation server, optionally subject to authentication of the user by the authorization server 170. In one embodiment, the video hosting server obtains all the annotations for the video as the video is being loaded. In other embodiments, annotations are streamed as the video progresses, or are sent in several predefined chunks.

The annotations that are appropriate can vary in different embodiments. In one embodiment, all annotations are provided, regardless of the user's identity. In another embodiment in which layers are employed, only those annotations created by the user viewing the video, or by members of a group to which the user belongs, are provided. The annotation server 150 may also convert the annotations to a suitable format for the particular client 130 based on knowledge about the client; for example, a translation of the text of the annotation can be performed if the client is in a locale with a language different from that of the annotation, and annotations not supported by the client, such as animated video annotations for a simple client limited to text, can be suppressed.

With the proper set of annotations selected and suitably formatted, the annotation server 150 then provides these annotations to the client 130, which displays them in conjunction with the playing video, thus modifying the appearance and/or behavior of the video, e.g. using the types of annotations described above in conjunction with FIGS. 2 and 3. For example, if the client 130 encounters any of annotation types 205, 210, 215 of FIG. 2, it will display textual labels in association with a portion of the video designated by the annotation. If an annotation has an associated hyperlink, then the client 130 will display the hyperlink and will take an action, such as displaying a web page linked to by the hyperlink, within a web browser, e.g. a web browser window in which the video and annotations were currently presented. If the annotation is of the Pause type, and the client 130 reaches the beginning of the time period to which the Pause annotation corresponds, then the client 130 halts playback of the video for a period of time specified by the Pause annotation, and then resumes playback after the expiration of the specified period of time.

It is appreciated that the exact components and arrangement thereof, the order of operations, and other aspects of the above description are purely for purposes of example, and a wide variety of alternative component arrangements and operation orders would be equally possible to one of skill in the art. For example, the annotation server 150 of FIG. 1 could be part of the video hosting server 108, a server on the same local network as the video hosting server, or on a remote network from the video hosting server. As another example, the authentication server 170 could be separate from the video hosting server, or could be a component thereof. Further, some clients 130 could be configured not to communicate with the annotation server 150, or the annotation server 150 not to provide annotations to the client 130, in which case the client 130 obtains un-annotated video (e.g. clients in each country or language can have their own set of annotations). In some embodiments, the client 130 can perform annotation offline, without a network connection to the annotation server 150, and later synchronize the annotations with the annotation server 150 when a network connection becomes available.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for annotating a digital video stored in a video repository, the method comprising:
    identifying a visual object displayed within the video using visual object recognition;
    determining whether a user, who did not contribute the digital video to the video repository, is authorized to annotate the digital video;
    responsive to the user being authorized to annotate the digital video, providing to the user a first web-based user interface portion for annotating the digital video, the first web-based user interface portion comprising visual representations of a plurality of different annotation types and a visual suggestion to annotate the visual object;
    responsive to receiving a user selection of one of the annotation types and approval of the suggestion of annotating the visual object, providing to the user a second web-based user interface portion comprising at least one input area for specifying a URL for a new annotation for the visual object, the URL separately encoding both an identifier of a target video and a time stamp of a moment within the target video;
    receiving a request from the user via the second user interface portion to add an annotation of the selected annotation type to the visual object, the request comprising a designation of the URL for the annotation;
    tracking a spatial position of the visual object across frames of the video to identify a plurality of spatial positions of the visual object as the visual object moves within the video; and
    adding the annotation to the digital video such that the annotation is displayed during playback of the digital video and moves responsive to the tracked plurality of spatial positions of the visual object, and such that selection of the annotation causes playback of the target video at the moment in the target video specified by the time stamp, the target video being different than the digital video.

2. The computer-implemented method of claim 1, wherein determining whether the user is authorized to annotate the digital video comprises comparing a URL associated with the user to a URL associated with the digital video.

3. The computer-implemented method of claim 1, wherein determining whether the user is authorized to annotate the digital video comprises determining whether the user is on a list of users authorized to annotate the digital video.

4. The computer-implemented method of claim 1, wherein determining whether the user is authorized to annotate the digital video comprises monitoring actions of a contributor of the digital video with respect to the user.

5. The computer-implemented method of claim 1, wherein determining whether the user is authorized to annotate the digital video comprises monitoring actions of other users with respect to the user.

6. The computer-implemented method of claim 1, further comprising determining whether the user is authorized to annotate a particular temporal or spatial portion of the digital video.

7. The computer-implemented method of claim 1, wherein determining whether the user is authorized to annotate the digital video comprises determining whether an owner of the digital video has disabled annotation for the digital video.

8. The computer-implemented method of claim 1, wherein the annotation is associated with a time range of the digital video and has a visual appearance.

9. The computer-implemented method of claim 1, further comprising receiving a request to add a pause annotation for a time within the digital video, the pause annotation causing playback of the digital video to halt when the time is reached.

10. The computer-implemented method of claim 1, wherein the annotation has a graphical appearance that when selected displays information associated with the visual object.

11. The computer-implemented method of claim 1, further comprising:
    responsive to receiving a request for the digital video from a client:
        providing annotations that are associated with the digital video and that can be displayed by the client.

12. The computer-implemented method of claim 1, further comprising:
    responsive to receiving a request for the digital video from a client:
        altering annotations that are associated with the digital video to be displayed in a different locale from a locale in which they were created.

13. The computer-implemented method of claim 1, further comprising:
    responsive to receiving a request for the digital video from a viewer:
        identifying annotations associated with the digital video;
        filtering the identified annotations by the identity of the viewer, thereby producing a modified set of annotations; and
        providing the modified set of annotations to the viewer.

14. The computer-implemented method of claim 1, further comprising:
    responsive to receiving a request for the digital video from a viewer:
        identifying annotations associated with the digital video;
        filtering the identified annotations by the identity of a group of which the viewer is a member, thereby producing a modified set of annotations;
        providing the modified set of annotations to the viewer.

15. The computer-implemented method of claim 1, wherein the request to add the annotation incorporates annotation data derived from optical character recognition.

16. A computer non-transitory readable storage medium storing a computer program executable by a processor for annotating a digital video stored in a video repository, the actions of the computer program comprising:
    identifying a visual object displayed within the video using visual object recognition;

determining whether a user, who did not contribute the digital video to the video repository, is authorized to annotate the digital video;

responsive to the user being authorized to annotate the digital video, providing to the user a first web-based user interface portion for annotating the digital video, the first web-based user interface portion comprising visual representations of a plurality of different annotation types and a visual suggestion to annotate the visual object;

responsive to receiving a user selection of one of the annotation types and approval of the suggestion of annotating the visual object, providing to the user a second web-based user interface portion comprising at least one input area for specifying a URL for a new annotation for the visual object, the URL separately encoding both an identifier of a target video and a time stamp of a moment within the target video;

receiving, from the user via the provided second user interface portion, a request to add an annotation of the selected annotation type to the visual object, the request comprising a designation of the URL for the annotation;

tracking a spatial position of the visual object across frames of the video to identify a plurality of spatial positions of the visual object as the visual object moves within the video; and adding the annotation to the digital video such that the annotation is displayed during playback of the digital video and moves responsive to the tracked plurality of spatial positions of the visual object, and such that selection of the annotation causes playback of the target video at the moment in the target video specified by the time stamp, the target video being different than the digital video.

17. A computer system for annotating a digital video stored in a video repository, comprising:
  a computer processor;
  an annotation database storing annotation data; and
  annotation logic comprising instructions that when executed by the computer processor perform actions comprising:
    identifying a visual object displayed within the video using visual object recognition;
    determining whether a user, who did not contribute the digital video to the video repository, is authorized to annotate the digital video;
    responsive to the user being authorized to annotate the digital video, providing to the user a first web-based user interface portion for annotating the digital video, the first web-based user interface portion comprising visual representations of a plurality of different annotation types and a visual suggestion to annotate the identified visual object;
    responsive to receiving a user selection of one of the annotation types and approval of the suggestion of annotating the visual object, providing to the user a second web-based user interface portion comprising at least one input area for specifying a URL for a new annotation for the visual object, the URL separately encoding both an identifier of a target video and a time stamp of a moment within the target video;
    receiving, from the user via the provided second user interface portion, a request to add an annotation of the selected annotation type to the visual object, the request comprising a designation of the URL for the annotation;
    tracking a spatial position of the visual object across frames of the video to identify a plurality of spatial positions of the visual object as the visual object moves within the video; and
    adding the annotation to the digital video such that the annotation is displayed during playback of the digital video and moves responsive to the tracked plurality of spatial positions of the visual object, and such that selection of the annotation causes playback of the target video at the moment in the target video specified by the time stamp, the target video being different than the digital video.

18. The computer-implemented method of claim 1, wherein adding the annotation to the digital video comprises storing the annotation within an annotation database on an annotation server that is physically separate from a video server that stores the digital video.

19. The computer-implemented method of claim 1, further comprising providing, to a second user, a user interface comprising:
  a representation of the digital video; and
  a visual timeline representing the duration of the digital video and time locations of a plurality of annotations associated with the digital video.

20. The computer-implemented method of claim 19, further comprising a user interface element for selectively displaying time locations of the plurality of associated annotations based on identities of users who added the annotations.

* * * * *